(12) United States Patent
Yoon et al.

(10) Patent No.: US 8,115,876 B2
(45) Date of Patent: Feb. 14, 2012

(54) APPARATUS AND METHOD FOR RECEIVING DIGITAL BROADCASTING

(75) Inventors: Jun Yoon, Gumi-si (KR); Kwang-Yoon Lee, Daegu (KR)

(73) Assignee: Samsung Electronics Co., Ltd (KR)

( * ) Notice: Subject to any disclaimer, the term of this patent is extended or adjusted under 35 U.S.C. 154(b) by 1652 days.

(21) Appl. No.: 11/448,952

(22) Filed: Jun. 7, 2006

(65) Prior Publication Data

US 2007/0008436 A1    Jan. 11, 2007

(30) Foreign Application Priority Data

Jul. 6, 2005 (KR) .................. 10-2005-0060783

(51) Int. Cl.
*H04N 5/50* (2006.01)
(52) U.S. Cl. ...................................... 348/732
(58) Field of Classification Search .......... 348/569, 348/570, 563–567, 723, 731, 725, 552, 553; 455/3.01, 456.3; 725/37, 62
See application file for complete search history.

(56) References Cited

U.S. PATENT DOCUMENTS

| | | | | |
|---|---|---|---|---|
| 4,731,654 A * | 3/1988 | Itabashi et al. | ................. | 348/725 |
| 5,483,686 A * | 1/1996 | Saka et al. | ................. | 455/182.2 |
| 5,953,665 A * | 9/1999 | Mattila | ................. | 455/434 |
| 6,317,168 B1 * | 11/2001 | Seo | ................. | 348/725 |
| 6,668,022 B1 * | 12/2003 | Kim | ................. | 375/240.27 |
| 7,221,412 B2 * | 5/2007 | Shibusawa | ................. | 348/732 |
| 7,405,772 B2 * | 7/2008 | Yukiyoshi | ................. | 348/732 |
| 2002/0097344 A1 | 7/2002 | Shibusawa | | |
| 2004/0068737 A1 * | 4/2004 | Itoh et al. | ................. | 725/14 |
| 2004/0135929 A1 * | 7/2004 | Hoda et al. | ................. | 348/732 |
| 2005/0085183 A1 * | 4/2005 | Lee | ................. | 455/3.01 |
| 2006/0064716 A1 * | 3/2006 | Sull et al. | ................. | 725/37 |
| 2006/0262227 A1 * | 11/2006 | Jeong | ................. | 348/723 |
| 2007/0033620 A1 * | 2/2007 | Kim et al. | ................. | 725/62 |

FOREIGN PATENT DOCUMENTS

CN    1287745    8/1999
CN    1402535    3/2003

* cited by examiner

*Primary Examiner* — Paulos M Natnael
(74) *Attorney, Agent, or Firm* — The Farrell Law Firm, P.C.

(57) ABSTRACT

Disclosed is an apparatus and a method for receiving digital broadcasting. The method includes receiving and outputting digital broadcasting data through a selected channel based on a user request, storing channel information about the selected channel, re-selecting a channel using the stored channel information if synchronization of the received digital broadcasting data is not achieved and receiving digital broadcasting data through the re-selected channel. Accordingly, it is possible to reduce unnecessary power consumption of the apparatus for receiving digital broadcasting and prevent the apparatus for receiving digital broadcasting from being down or inoperative in a weak electric field and other specific environments.

22 Claims, 3 Drawing Sheets

APPARATUS AND METHOD FOR RECEIVING DIGITAL BROADCASTING

PRIORITY

This application claims priority to an application entitled "Apparatus and Method for Receiving Digital Broadcasting" filed in the Korean Intellectual Property Office on Jul. 6, 2005 and assigned Serial No. 2005-60783, the contents of which are incorporated herein by reference.

BACKGROUND OF THE INVENTION

1. Field of the Invention

The present invention relates to an apparatus for receiving digital broadcasting, and more particularly, to an apparatus and a method for efficiently receiving digital broadcasting data through a channel selected by a user in a weak electric field, or other specific environments.

2. Description of the Related Art

Generally, digital broadcasting provides a user with a high-definition and high sound quality service, and significantly improves over the conventional analog broadcasting. Digital broadcasting is classified into satellite digital broadcasting and terrestrial digital broadcasting.

Satellite digital broadcasting is mainly for a mobile service and allows a user to view multi-channel multimedia broadcasting regardless of time and location through a portable receiver (e.g., a mobile phone or a personal digital assistant) or a vehicle receiver.

Terrestrial digital broadcasting, derived from digital audio broadcasting (DAB), is multimedia broadcasting received by a user in movement using an empty VHF 12 channel, and denotes transmission of complex broadcasting such as television, radio and data broadcasting using multiple channels.

Meanwhile, one channel of terrestrial digital broadcasting provides three blocks, and two video channels per one block, or one video channel and three or four audio channels per one block may be generated. In addition, terrestrial digital broadcasting aims at providing free-of-charge broadcasting to vehicles.

With the recent development of digital broadcasting and mobile communication techniques, interest has increased in a digital broadcasting service that enables a user to view digital broadcasting while the user is moving. In particular, the interest in a digital multimedia broadcasting (DMB) service through a mobile communication terminal has significantly increased.

In the meantime, if the conventional apparatus for receiving digital broadcasting (i.e., a mobile communication terminal, a vehicle receiver and a home receiver), which can be installed at a portable terminal, is located in a specific channel environment such as a weak electric field area while receiving digital broadcasting data through a channel selected by a user, the conventional apparatus for receiving digital broadcasting may not achieve the synchronization of the received digital broadcasting data. This is because the bit error rate (BER) of the received digital broadcasting data greatly increases due to characteristics of the Viterbi algorithm in the state in which the frequency of the selected channel is set.

Accordingly, the apparatus for receiving digital broadcasting unnecessarily consumes power because it continuously detects a synchronization value in order to achieve the synchronization of digital broadcasting data through the selected channel. In addition, the apparatus for receiving digital broadcasting may be down or in an inoperative state when the set frequency of the selected channel is released.

SUMMARY OF THE INVENTION

Accordingly, the present invention has been made to solve the above-mentioned problems occurring in the prior art, and an object of the present invention is to provide an apparatus and a method for receiving digital broadcasting, which can reduce unnecessary power consumption in a weak electric field area, or other specific environments.

Another object of the present invention is to provide an apparatus and a method for receiving digital broadcasting, which can efficiently receive digital broadcasting data through a channel selected by a user in a weak electric field area, or other specific environments.

To accomplish the above objects, there is provided a method for receiving digital broadcasting in an apparatus for receiving digital broadcasting, including receiving and outputting digital broadcasting data through a selected channel based on a user request, storing channel information about the selected channel, re-selecting a channel using the stored channel information if synchronization of the received digital broadcasting data is not achieved, and receiving digital broadcasting data through the re-selected channel.

According to another aspect of the present invention, there is provided an apparatus for receiving digital broadcasting, including a digital broadcasting modem module for receiving digital broadcasting data through a channel selected by a user, a memory module for storing channel information regarding the selected channel, an output module for outputting the digital broadcasting data transmitted to the digital broadcasting modem module, and a controller for controlling the digital broadcasting modem module to receive the digital broadcasting data based on the channel information stored in the memory if synchronization of the digital broadcasting data transmitted to the digital broadcasting modem module is not achieved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
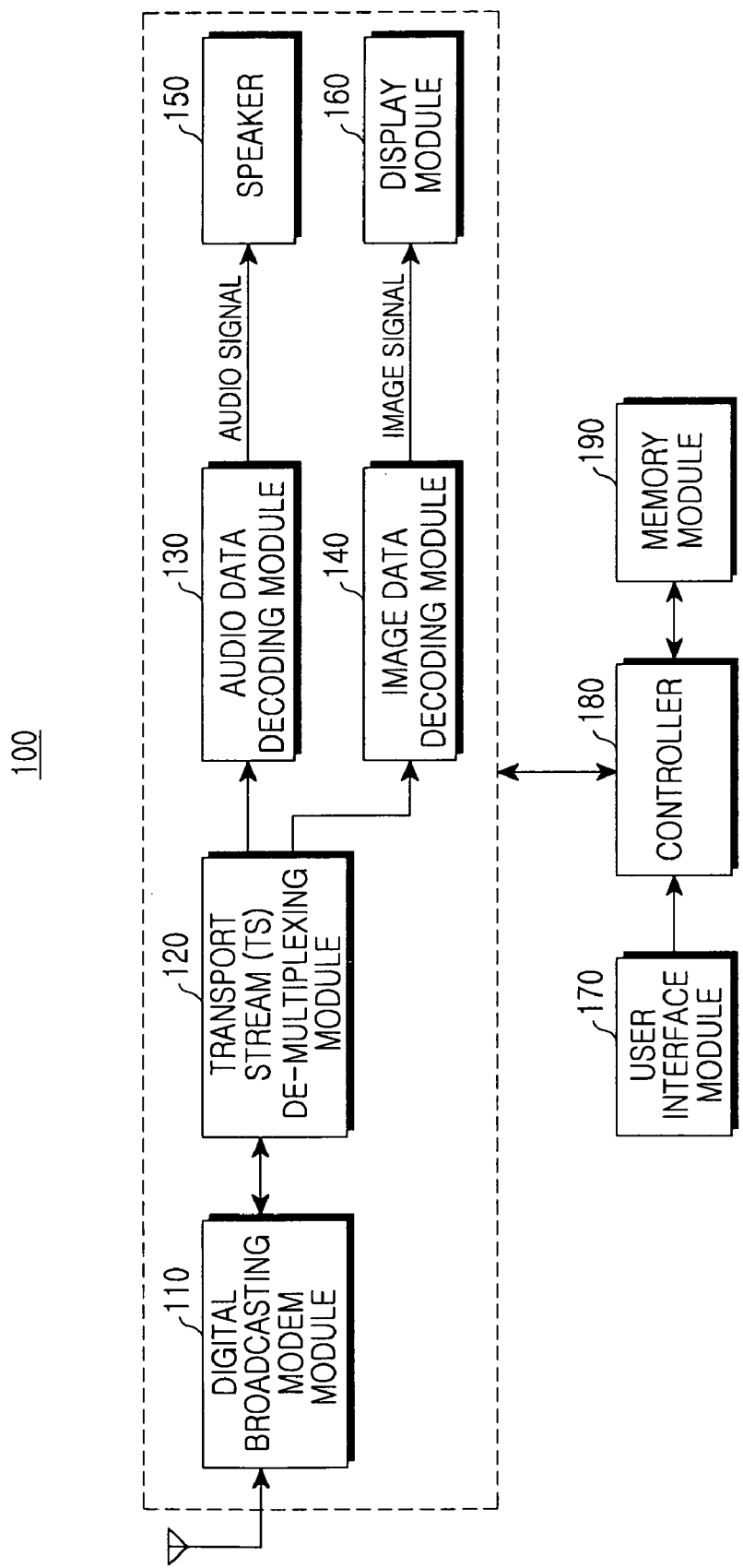
FIG. 1 is a block diagram illustrating the structure of an apparatus for receiving digital broadcasting according to the present invention.

Hereinafter, a preferred embodiment of the present invention will be described in detail with reference to the accompanying drawings. Note that the same or similar components in the drawings are designated by the same reference numerals although they are shown in different drawings. In the following description of the present invention, a detailed description of known functions and configurations incorporated herein will be omitted for the sake of clarity and conciseness.

FIG. 1 is a block diagram illustrating the structure of an apparatus 100 for receiving digital broadcasting according to the present invention.

The apparatus 100 includes a digital broadcasting modem module 110, a transport stream (TS) de-multiplexing module 120, an audio data decoding module 130, an image data decoding module 140, a speaker 150, a display module 160, a user interface module 170, a controller 180, and a memory module 190. According to the present invention, the display module 160 and the speaker 150 act as an output module.

The digital broadcasting modem module 110 receives digital broadcasting data of a channel frequency selected through a user request and demodulates the received digital broadcasting data into digital data streams to be output under the control of the controller 180. The digital broadcasting data may be one of digital multimedia broadcasting (DMB) data or digital audio broadcasting (DAB) data.

The TS de-multiplexing module 120 divides the received digital broadcasting data into an audio data stream and a video data stream by de-multiplexing the received digital broadcasting data.

The audio data decoding module 130 decodes the audio data stream received from the TS de-multiplexing module 120 to an analog audio signal to be output to the speaker 150.

The image data decoding module 140 decodes the video data stream received from the TS de-multiplexing module 120 to an analog video signal to be output to the display module 160.

The display module 160 outputs various display data generated in the apparatus 100 for receiving digital broadcasting. Herein, it is preferred that the display module 160 includes a liquid crystal display capable of sufficiently supporting the resolution of the digital broadcasting data. In this case, if the LCD is realized through a touch screen scheme, the display module 160 operates as an input module.

The user input module 170 receives a user's operation signal such as a key input signal or a voice input signal and delivers the user's operation signal to the controller 180.

The controller 180 controls the entire operation of the apparatus 100 for receiving digital broadcasting according to the present invention. In addition, if there is a request for digital broadcasting through a channel selected by a user, the controller 180 sets a frequency to be received by the digital broadcasting modem module 110 to a specific frequency of the selected channel and stores channel information about the selected channel in the memory module 190. Accordingly, the digital broadcasting modem module 110 can receive digital broadcasting through the set channel frequency. In the meantime, the channel information includes a channel number and frequency information corresponding to the channel number.

If the apparatus 100 for receiving digital broadcasting does not achieve synchronization of the received digital broadcasting data because the apparatus 100 is located in a weak electric field area or other specific environments while receiving digital broadcasting data, the controller 180 controls the digital broadcasting modem module 110 based on channel information stored in the memory module 190 so as to receive the digital broadcasting data.

In other words, if the controller 180 does not achieve synchronization of the digital broadcasting data based on preset information, the controller 180 initializes the digital broadcasting modem module 110. Then, the controller 180 controls the broadcasting modem module 110 to reselect a channel for digital broadcasting data and receive the digital broadcasting data based on channel information stored in the memory 190. The setting information refers to information representing time (e.g., one minute) and frequency (e.g., one per 5 seconds) required for detecting a synchronization value of digital broadcasting data (e.g., 0x47 of a TS packet), which are transmitted to the digital broadcasting modem module 110. The setting information may be set by a user.

In the meantime, it is preferred that the controller 180 stores the received digital broadcasting data in the memory module 190 before initializing the digital broadcasting modem module 110 if the received digital broadcasting data are digital multimedia broadcasting data instead of digital audio broadcasting data. This is necessary for outputting digital broadcasting data stored in the memory module 190 to the display module 160 as a still image after initializing the digital broadcasting modem module 110 because the digital broadcasting data is not output to the display module 160 if the digital broadcasting modem module 110 is initialized.

Hereinafter, a brief description of a method for determining whether the digital broadcasting data is of the audio or multimedia type will be given.

The digital broadcasting modem module 110 divides the received digital broadcasting data into a main service channel (MSC) including broadcasting data according to sub-channels (i.e., a video channel, an audio channel, and a data channel) and a fast information channel (FIC) representing information regarding the MSC and delivers the digital broadcasting data to the controller 180. The MSC includes broadcasting data (i.e., real audio/video data).

The controller 180 determines the type of the digital broadcasting data by analyzing the FIC. In other words, the controller 180 determines whether the digital broadcasting data is audio (digital audio broadcasting data) or video (digital multimedia broadcasting data) based on a 13-bit program identifier (PID) of the TS packet. Since the above description is generally known to those skilled in the art, further description will be omitted.

In the meantime, the controller 180 controls the digital broadcasting modem module 110 to output a message used for obtaining a user's approval for the reception of the digital broadcasting data again if the digital broadcasting modem module 10 re-selects a channel for receiving digital broadcasting data based on channel information stored in the memory 190 and then does not receive digital broadcasting data within the predetermined time (e.g., 5 seconds). The message may be output as a voice message through the speaker 150 or a text message through the display module 160.

If the user, who has confirmed the message, does not approve the reception of the digital broadcasting data, the controller 180 switches the operational mode of the apparatus 100 for receiving digital broadcasting to an idle mode.

The memory module 190 stores various information required for controlling the operation of the apparatus 100 for receiving digital broadcasting according to the present invention. In addition, the memory module 190 stores channel information about a channel requested by a user and digital broadcasting data through the channel under the control of the controller 180.

Figure 2:
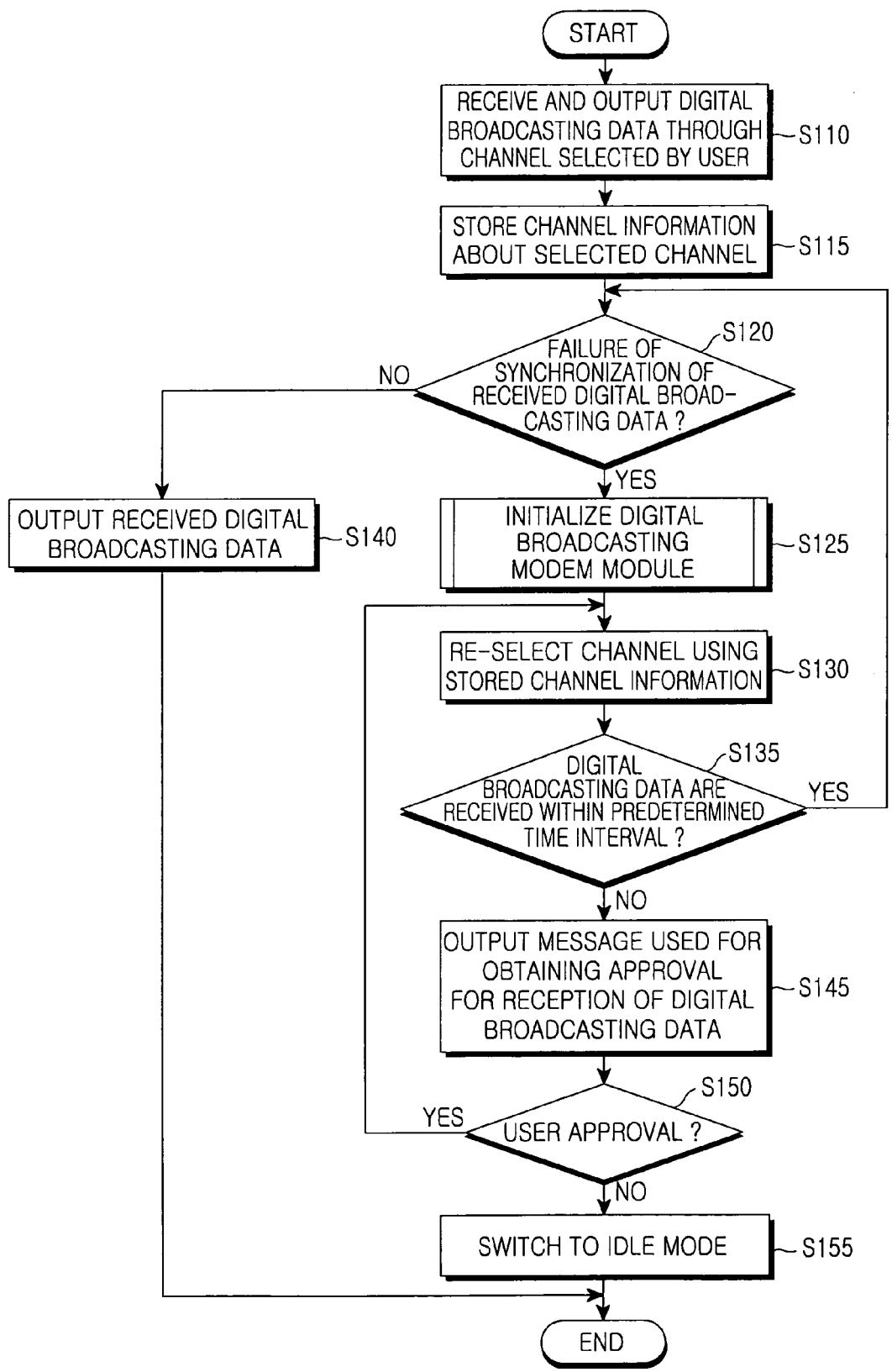
FIG. 2 is a flowchart illustrating the operational procedure of the apparatus for receiving digital broadcasting according to the present invention.

FIG. 2 is a flowchart illustrating the operational procedure of the apparatus 100 for receiving digital broadcasting according to the present invention.

Referring to FIGS. 1 and 2, the controller 180 receives digital broadcasting data through a channel selected by a user by means of the digital broadcasting modem module 110, achieves the synchronization with the digital broadcasting data, and then outputs the digital broadcasting data by means of an output module in step S110. In other words, when there is a request for digital broadcasting through the channel selected by the user, the controller 180 sets a frequency to be received by the digital broadcasting modem module 110 to a specific frequency of the selected channel so as to allow the digital broadcasting modem module 110 to receive digital broadcasting data of the set channel frequency. In the meantime, the digital broadcasting data may be multimedia or audio data.

The controller 180 stores channel information regarding the selected channel in the memory module 190 in step S115. The channel information includes a channel number and frequency information corresponding to the channel number.

The controller 180 determines whether it achieves the synchronization of digital broadcasting data received through the digital broadcasting modem module 110 in step S120. Thereafter, if the controller 180 achieves the synchronization of digital broadcasting data, the controller 180 decodes the digital broadcasting data into analog audio signal and video signals to be output through the output module in step S140.

If the controller 180 fails to achieve the synchronization of the received digital broadcasting data, the controller 180 determines that the apparatus 100 for receiving digital broadcasting is located in a weak electric field area or other specific environments and then initializes the digital broadcasting modem module 110 in step S125.

The controller 180 initializes the digital broadcasting modem module 110 and then re-selects the channel based on channel information stored in the memory 190 in step S130. In other words, the controller 180 performs a control operation in such a manner that digital broadcasting data is received through the channel selected by the user without selecting by the user an additional channel by re-setting the channel frequency, which has been set for the digital broadcasting modem module 110 in step S110, based on the stored channel information.

The controller 180 determines whether digital broadcasting data through the re-selected channel is transmitted to the digital broadcasting modem module 110 within a predetermined time interval (e.g., 5 seconds) in step S135.

If digital broadcasting data through the re-selected channel is transmitted to the digital broadcasting modem module 110 within a predetermined time interval, the controller 180 returns to step S120 so as to determine whether the synchronization of the received digital broadcasting data is achieved.

If the controller 180 can achieve the synchronization of the received digital broadcasting data, the controller 180 may decode the digital broadcasting data into an analog audio or video signal to be output to the output module in step S140.

In the meantime, if the digital broadcasting data through the re-selected channel is not transmitted to the digital broadcasting modem module 110 within a predetermined time interval in step S135, the controller 180 outputs a message used for obtaining a user's approval for the reception of the digital broadcasting data through the output module in step S145. The message may be output as a voice message through the speaker 150 or a text message through the display module 160.

The controller 180 determines whether the user having confirmed the message approves the reception of the digital broadcasting data in step S150. Thereafter, the controller 180 returns to step S130 if the user has so approved.

Thereafter, if the user has not approved in step S150, the controller 180 switches the operational mode of the apparatus 100 for receiving digital broadcasting into an idle mode in step S155 and then terminates the operational procedure of the apparatus 100 for receiving digital broadcasting.

As described above, according to the present invention, it is possible to reduce unnecessary power consumption of the apparatus 100 for receiving digital broadcasting and prevent the apparatus 100 for receiving digital broadcasting from being down or inoperative in a weak electric field, or other specific environments.

Figure 3:
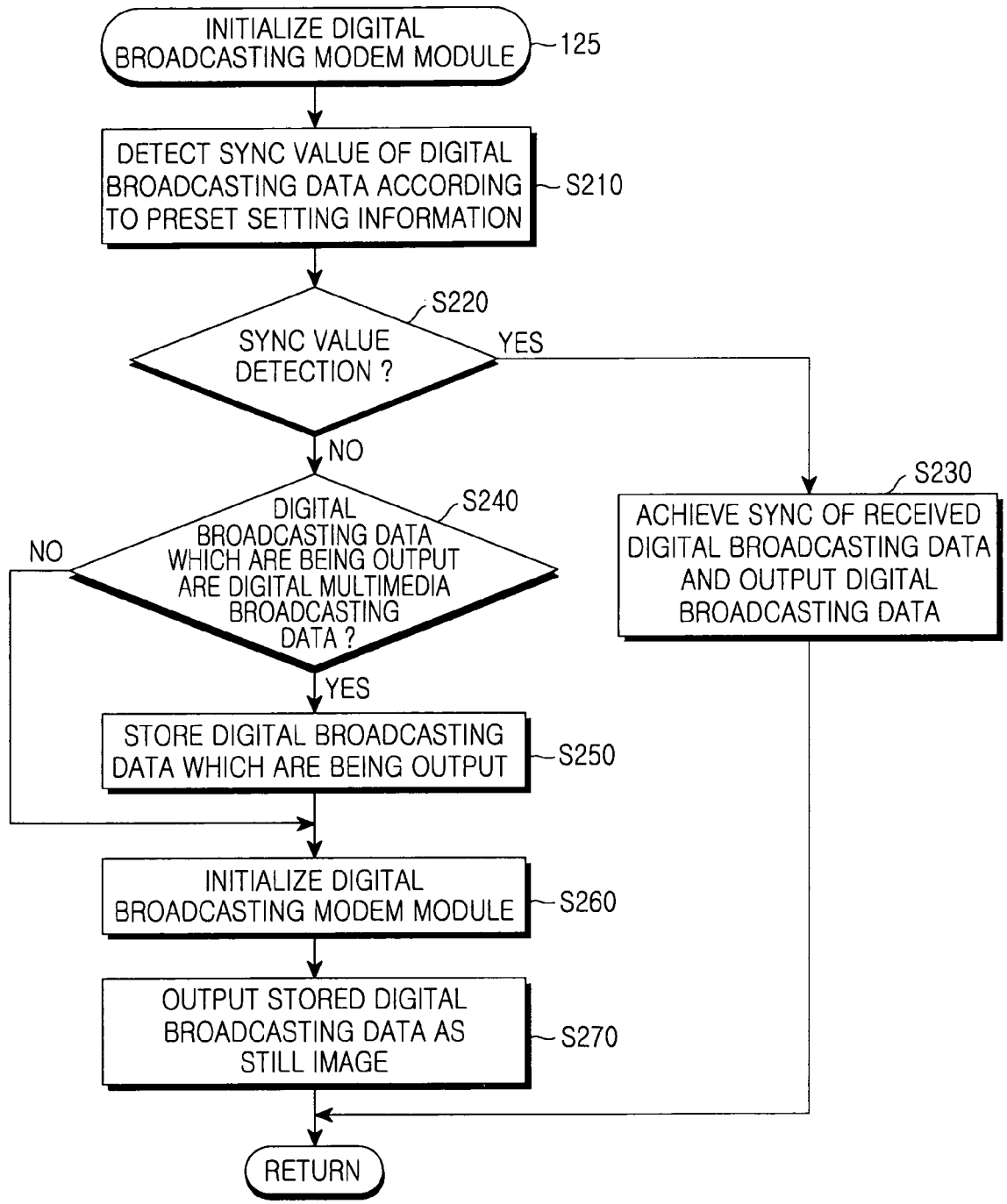
FIG. 3 is a flowchart illustrating the procedure for initializing a digital broadcasting modem module in the operational procedure shown in FIG. 2.

FIG. 3 is a flowchart illustrating the procedure for initializing digital broadcasting modem module (S125) in the operational procedure shown in FIG. 2. Referring to FIGS. 1 and 3, if the controller 180 fails to achieve the synchronization of the received digital broadcasting data, the controller 180 detects a synchronization (Sync) value (e.g., 0x47 of the TS packet) of the digital broadcasting data based on preset information in step S210. The preset information represents time and frequency required for detecting a synchronization value of the received digital broadcasting data. The setting information may be set by a user.

If the controller 180 detects the synchronization value, the controller 180 achieves the synchronization value of the received digital broadcasting data to be output to the output module in step S230.

If the controller 180 does not detect the synchronization value, the controller 180 determines whether digital broadcasting data being output through the output module, is digital multimedia broadcasting data in step S240. The controller 180 determines whether the digital broadcasting data is audio (digital audio broadcasting data) or video (digital multimedia broadcasting data) based on a 13-bit program identifier (PID) of the TS packet.

If the digital broadcasting data is the multimedia type, the controller 180 stores the digital broadcasting data in the memory module 190 in step S250. This is necessary for outputting digital broadcasting data stored in the memory module 190 to the display module 160 as a still image after initializing the digital broadcasting modem module 110 because the digital broadcasting data is not output to the display module 160 if the digital broadcasting modem module 110 is initialized. If the digital broadcasting data is the audio type, the controller 180 performs a next step without performing step S250.

The controller 180 initializes the digital broadcasting modem module 110 in step S260 and outputs digital broadcasting data stored in the memory module 190 to the display module 160 as a still image in step S270.

As described above, according to the present invention, it is possible to reduce unnecessary power consumption of the apparatus 100 for receiving digital broadcasting and prevent the apparatus 100 for receiving digital broadcasting from being down or inoperative in a weak electric field and other specific environments.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for receiving digital broadcasting in an apparatus for receiving digital broadcasting, the method comprising the steps of:
   receiving and outputting digital broadcasting data through a selected channel based on a user request;
   storing channel information about the selected channel;
   re-selecting the selected channel using the stored channel information if synchronization of the received digital broadcasting data is not achieved; and
   receiving digital broadcasting data through the re-selected channel.

2. The method as claimed in claim 1, wherein the digital broadcasting data is one of digital multimedia broadcasting data and digital audio broadcasting data.

3. The method as claimed in claim 1, wherein the channel information includes a channel number and frequency information corresponding to the channel number.

4. The method as claimed in claim 1, wherein the step of re-selecting a channel comprises:
   initializing a digital broadcasting modem module which receives the digital broadcasting data through the selected channel based on the user request if the synchronization of the received digital broadcasting data is not achieved; and
   re-selecting the channel for reception of the digital broadcasting modem module using the stored channel information.

5. The method as claimed in claim 4, wherein the step of initializing the digital broadcasting modem module comprises:
   detecting a synchronization value of the digital broadcasting data based on preset information, in order to achieve the synchronization of the received digital broadcasting data; and
   initializing the digital broadcasting modem module if the synchronization value is not detected.

6. The method as claimed in claim 5, wherein the step of initializing the digital broadcasting modem module further comprises storing output digital broadcasting data before the digital broadcasting modem module is initialized if the digital broadcasting data is digital multimedia broadcasting data.

7. The method as claimed in claim 6, further comprising outputting the stored digital broadcasting data as a still image after the digital broadcasting modem module is initialized.

8. The method as claimed in claim 5, wherein the preset information represents time and frequency of detecting the synchronization value of the received digital broadcasting data.

9. The method as claimed in claim 8, wherein the preset information is set by the user.

10. The method as claimed in claim 1, wherein the step of receiving the digital broadcasting data through the re-selected channel comprises:
    outputting a message used for obtaining a user's approval for reception of the digital broadcasting data if the digital broadcasting data through the re-selected channel is not received within a predetermined time interval; and
    repeating re-selection of the channel and reception of the digital broadcasting data if the user's approval exists.

11. The method as claimed in claim 10, further comprising switching an operation mode of the apparatus for receiving digital broadcasting to an idle mode if the user's approval is not obtained.

12. An apparatus for receiving digital broadcasting, comprising:
    a digital broadcasting modem module for receiving digital broadcasting data through a channel selected by a user;
    a memory module for storing channel information regarding the selected channel;
    an output module for outputting the digital broadcasting data transmitted to the digital broadcasting modem module; and
    a controller for controlling the digital broadcasting modem module to re-receive the digital broadcasting data through the selected channel based on the channel information stored in the memory module if synchronization of the digital broadcasting data transmitted to the digital broadcasting modem module is not achieved.

13. The apparatus as claimed in claim 12, wherein the digital broadcasting data is one of digital multimedia broadcasting data and digital audio broadcasting data.

14. The apparatus as claimed in claim 12, wherein the channel information includes a channel number and frequency information corresponding to the channel number.

15. The apparatus as claimed in claim 12, wherein, if the synchronization of the digital broadcasting data is not achieved, the controller receives digital broadcasting data by re-selecting the channel for reception of the digital broadcasting modem module according to channel information stored in the memory module after initializing the digital broadcasting modem module.

16. The apparatus as claimed in claim 15, wherein the controller detects a synchronization value of the digital broadcasting data according to preset information, and, if the synchronization value of the digital broadcasting data is not detected, the controller initializes the digital broadcasting modem module.

17. The apparatus as claimed in claim 16, wherein the controller controls the received digital broadcasting data to be stored in the memory module before the digital broadcasting modem module is initialized if the received digital broadcasting data is digital multimedia broadcasting data.

18. The apparatus as claimed in claim 17, wherein the controller controls the digital broadcasting modem module to output the digital broadcasting data stored in the memory module as a still image after the digital broadcasting modem module is initialized.

19. The apparatus as claimed in claim 16, wherein the preset information represents time and frequency of detecting the synchronization value of the received digital broadcasting data.

20. The apparatus as claimed in claim 19, wherein the preset information is set by the user.

21. The apparatus as claimed in claim 15, wherein the controller outputs through the output module a message used for obtaining a user's approval for reception of the digital broadcasting data, if the digital broadcasting data through the re-selected channel is not received within a predetermined time interval.

22. The apparatus as claimed in claim 21, wherein the controller switches an operation mode of the apparatus for receiving digital broadcasting to an idle mode if the user's approval is not obtained.

\* \* \* \* \*